United States Patent Office 3,104,559
Patented Sept. 24, 1963

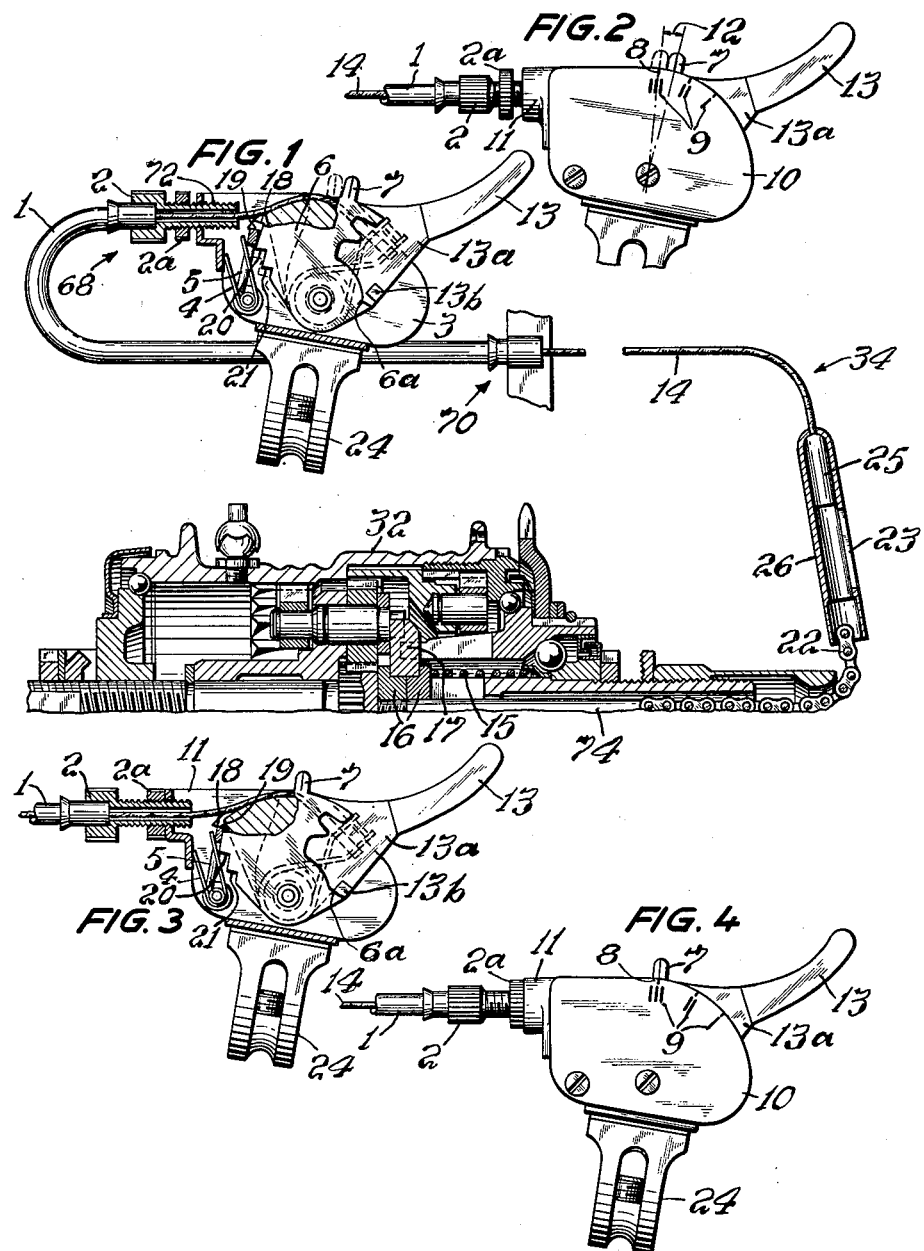

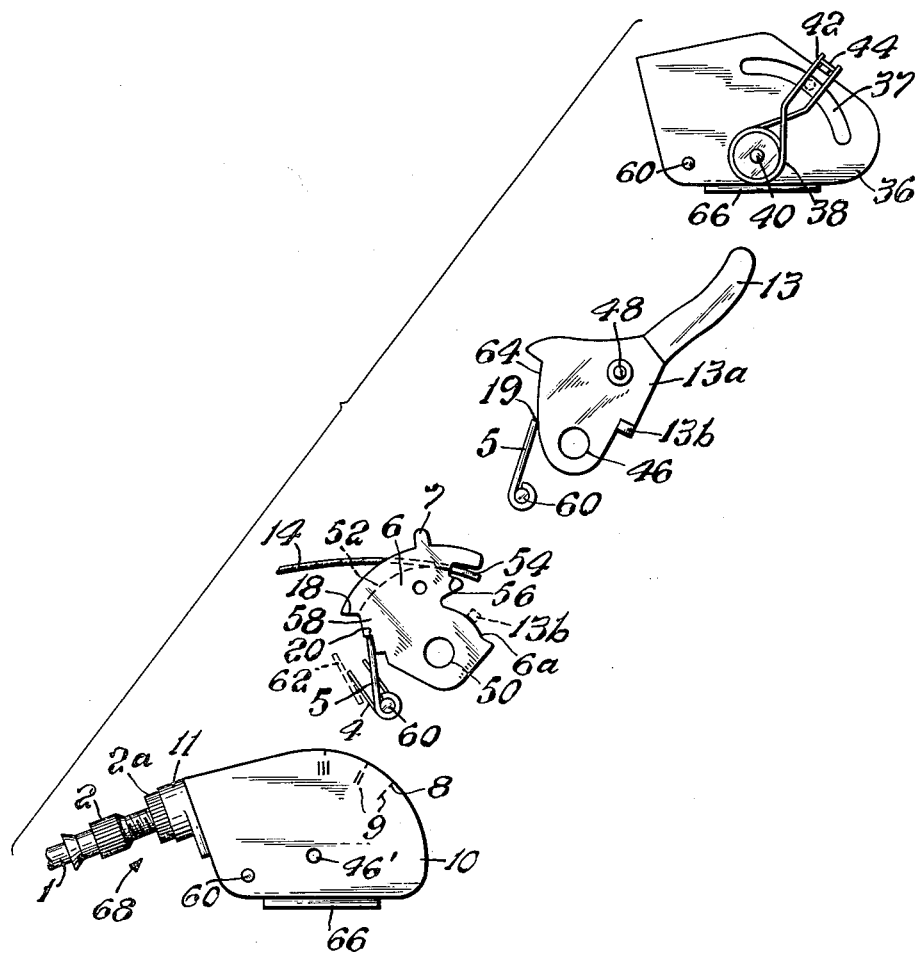

3,104,559
VARIABLE SPEED TRANSMISSION ARRANGE-
MENT FOR A BICYCLE AND THE LIKE
Paul Dotter, Schweinfurt (Main), Germany, assignor to
Fichtl & Sachs A.G., Schweinfurt (Main), Germany,
a corporation of Germany
Filed July 1, 1959, Ser. No. 824,356
Claims priority, application Germany July 5, 1958
9 Claims. (Cl. 74—489)

The invention relates to a variable speed transmission arrangement for a bicycle and the like, and more particularly to a method and device for adjusting transmission arrangements having a lever for actuating speed changes and a cable transmission connecting the actuating lever to a variable-speed gear which is commonly installed in the rear wheel hub of the bicycle.

The transmission ratio of variable-speed or multiple-speed gears installed in the rear wheel hub is controlled by an actuating lever usually mounted at an appreciable distance on the handle bars of the bicycle and operating against a return spring in the hub. The relatively long tension member which transmits movement of the lever to the gears includes a Bowden cable assembly and a wire rope, tension wire, chain and the like trained over guide rolls mounted on the bicycle frame. The elements of the Bowden cable assembly, as well as other tension members are subject to length changes during operation, and particularly during the early stages of operation after assembly of the bicycle. The elements stressed in tension tend to lengthen, and the flexible tube of the Bowden assembly which is under compressive stress when operated tends to become shorter. This shortening of the Bowden tube is equivalent in effect to a corresponding lengthening of the Bowden wire.

If the bicycle was originally adjusted in such a manner that predetermined positions of the actuating lever corresponded to the proper engaging position of the gears in the rear wheel hub, for the several transmission ratios available, lengthening of the tension members interposed between the hub and the actuating lever interferes with this correlation. When the movable elements of the multi-speed hub are moved by the return spring into the most relaxed position of the spring, the tension element is no longer taut. In a subsequent speed changing operation, a portion of the movement of the speed-change actuating lever is spent for taking up the slack in the tension member without any movement of the internal hub mechanism. When the actuating lever reaches a position originally corresponding to the desired speed and is arrested in this position, the hub mechanism has traveled only partly toward the position corresponding to the newly set speed. Engagement of the gears is not complete.

Proper functioning of a variable- or multiple-speed hub and the length of its useful life depend on correct alignment of the several interengaging elements of the gear transmission. Partial engagement of gears causes the force transmitted to be concentrated on small portions of the gear teeth which wear prematurely and may actually fail. In the case of severe misalignment, the gears may clash and be severely damaged. It is, therefore, necessary that the relative position of the movable elements in the multiple-speed transmission and of the actuating lever be adjusted from time to time to compensate for the length changes in the tension members connecting the actuating elements and the transmission elements, and variable-speed bicycle transmissions have been equipped with special adjusting arrangements for this purpose.

The adjusting arrangements known so far rely on a change in the relative position of elements in the hub or associated with the hub. Some of these arrangements require special tools or implements and substantial mechanical skill. Even those that are relatively simple to manipulate and are adjustable by simple means are not accessible or visible while the bicycle is being operated. The need for adjustment thus is not recognized and only damage to the gears may draw the operator's attention to a condition which should have been remedied earlier. Since the hub of the rear wheel is exposed to contamination by dust and other foreign matter, marks intended to indicate the condition of the transmission arrangement are frequently obliterated.

Any adjustment of the length of the tension member connecting the actuating lever with the transmission gears involves simultaneous operation of the lever and observation of indices of some kind which indicate when the proper adjusted condition is reached. An adjustment made at the hub of the rear wheel, even when its progress can be observed there, is inconvenient and difficult because of the need for also reaching the actuating lever usually mounted on the handlebars.

It is a principal object of the present invention to provide a variable- or multiple-speed transmission arrangement for a bicycle and the like the adjustment of which can be observed and even varied during operation of the bicycle.

A second object is the provision of such an arrangement which permits observation and adjustment to be made at or near the handlebars of the bicycle.

Another object is to provide for close spacing of the visible marks indicating the state of adjustment and of the adjusting means so that adjustment may be made by an operator while he observes the marks.

Yet another object is to locate the marks and the adjusting means at a location on the bicycle which is protected against contamination by dust and other foreign matter usually encountered on the road.

A further important object is to provide adjustment means and a method of adjustment which are simple so that adjustment can be performed without special tools, and preferably by hand, even while the operator rides the bicycle.

With these and other objects in view, the variable- or multiple-speed arrangement of the invention provides a support on which a speed change actuator is mounted for reciprocating movement between a plurality of positions. A transmission member is reciprocably movable between a plurality of positions for changing the transmission ratio of the transmission arrangement. The actuator and the transmission member are connected by a tension member which is secured to the actuator and the transmission member for moving the transmission member in one direction only when the actuator is moved in a corresponding direction. Return movement of the transmission in a direction opposite to the first-mentioned direction is actuated by resilient means which are operatively connected to the transmission member so as to exert tension on the tension member and to move the same together with the actuator. Movement of the transmission member under the urging of the resilient means is limited by stop means. A tensioning means mounted on the support acts in opposition to the resilient means mentioned above for maintaining tension in the tension member while the same is being moved by the resilient means. Adjusting means are provided on the support for varying the effective length of the tension member while it is tensioned by the resilient means and the tensioning means.

The speed change actuator is preferably pivotally mounted and indicator means are provided for indicating the desired relative position of the actuator and the support at least at one of the speeds of the transmission arrangement, and movement of the transmission member in the return direction is limited by the stop means in a position corresponding to the one indicated speed.

The tensioning means acts on the tension member with sufficient force to maintain the tension thereof not only during return movement of the tension member under the constraint of the resilient means, but also after the movement has stopped. The force of the tensioning means, however, is smaller than that of the resilient means so that the tensioning means will yield to the resilient means.

The speed-change actuator is preferably equipped with a stop member which engages the actuator for arresting it in at least one predetermined position while the actuator is being moved by the resilient means, and this one predetermined position of the actuator corresponds to a position of the transmission member which is intermediate the two terminal positions of its reciprocating movement one of which is determined by the afore-mentioned stop means. The stop is urged into its engaged position with the actuator by a resilient member which simultaneously serves as tensioning means for the tension member.

In its more specific aspects, the invention provides a Bowden cable arrangement including a flexible tube and a tension wire in the tube. The two ends of the Bowden tube are fastened respectively to the housing of the speed-change actuator and to a portion of the bicycle fixedly spaced from the transmission, and thus to the transmission itself. The two ends of the Bowden wire or of extensions thereof are fastened to the speed-change actuator and the movable transmission member. One end of the Bowden tube is fastened to the actuator housing by means of a nipple threadedly engaging the housing so that the effective length of the Bowden tube can be increased or decreased by turning the nipple, whereby the effective length of the Bowden wire is changed in the opposite direction.

Other features and the advantages of the invention will become apparent to those skilled in the art as the disclosure is made in the following detailed description of a preferred embodiment of the invention as illustrated in the accompanying drawing in which:

FIG. 1 is a sectional view of the arrangement of the invention, the section being taken substantially in the plane of movement of the speed-change actuator lever and on the axis of the rear wheel hub which is equipped with a three-speed gear drive. The device is shown in the non-adjusted condition and set for third speed.

FIG. 2 is a side-elevational view of the speed-change actuator assembly of FIG. 1.

FIG. 3 shows a detail of FIG. 1, the speed-change actuator assembly being in the adjusted condition.

FIG. 4 is a side-elevational view of the device of FIG. 3.

FIG. 6 is an exploded view of the speed-change actuator assembly of the invention, the individual elements being shown in side elevation.

Figure 5:
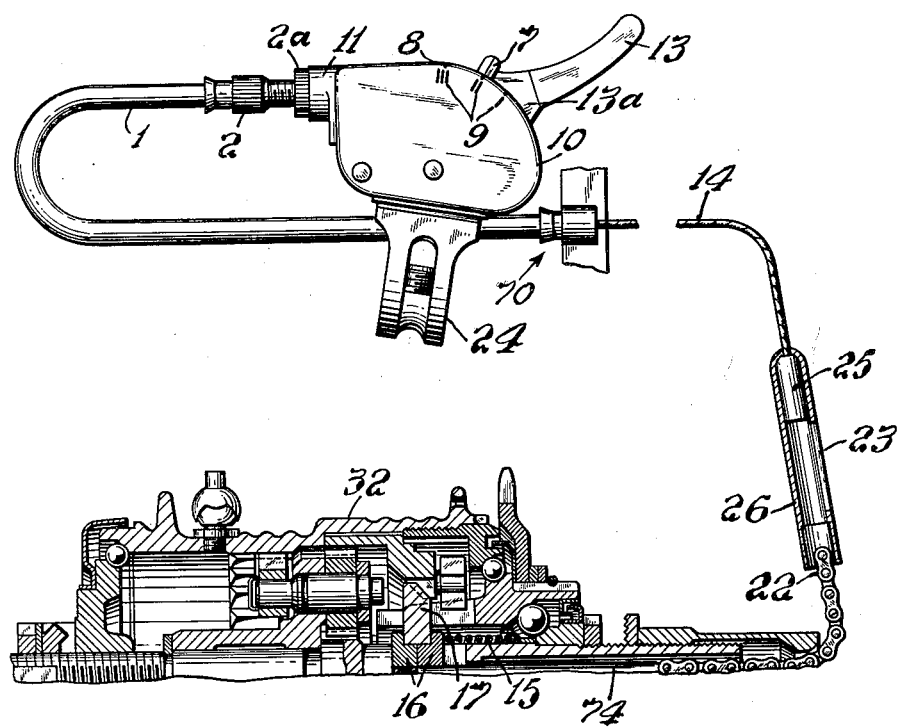
FIG. 5 is a view similar to that of FIG. 1, but showing the speed-change actuator assembly in side-elevational view, the transmission arrangement being set for a speed different from that of FIG. 1 and in the adjusted condition.

Referring now to the drawing, and more particularly to FIG. 1, there is shown a speed-change actuator assembly 3 provided with a clamp 24 for mounting on the handle bars of a bicycle and connected to the three-speed rear wheel hub 32 of the bicycle by a control cable assembly 34 so that the gears in the hub 32 can be shifted by operating the actuator assembly.

The control cable assembly 34 includes a Bowden tube 1 which is axially fastened but rotatable in a nipple 2. The nipple has external threads 72 which engage a mating threaded opening in the stationary portion of the actuator assembly. The effective length of the Bowden tube 1 can thus be adjusted by turning the nipple 2 and the nipple can be fixed in the adjusted position of the Bowden tube by tightening a lock nut 2a against the outside of the actuator assembly. The nipple 2, lock nut 2a, and the cooperating element of the actuator assembly jointly form an adjustable connection 68 for one end of the Bowden tube 1.

The other end of the Bowden tube 1 is fixedly fastened at a connection 70 to a portion of the bicycle frame which is fixedly spaced from the rear wheel hub 32 so that the tube 1 forms a flexible bridge of substantially constant length between the adjustable connection 68 on the handle bars and the fixed connection 70 on the bicycle frame even during relative movement of the handle bars and the frame.

The Bowden wire 14 of the control cable assembly 34 passes through the tube 1 and one end thereof is fastened to the actuating lever 13 as will be discussed in more detail below. The other end of the Bowden wire 14 is trained over guide pulleys on the bicycle frame (not shown) and terminates in an enlarged head 25 which axially engages one end of a coupling sleeve 26. The sleeve 26 has an axially extending key-hole shaped slot 23 the wider portion of which permits passage of the head 25 whereas the narrower portion of the slot passes the wire 14 but retains the head 25. The sleeve 26 and the head 25 jointly form a quick-connecting coupling which may be quickly disengaged for performing repairs on the rear wheel and for similar purposes.

The other end of the sleeve 26 is pivotally connected to a roller chain 22 which enters the rear wheel hub 32 through a hollow axial pin mounted on the stationary shaft of the hub. The hub encloses bearings, planetary gearing and dog clutches cooperating in a well-known manner and not requiring more detailed description. The transmission ratio of the three-speed hub of which one half only is shown is changed by shifting a sliding block 16 which is fixedly mounted on a pull rod 74. The sliding block 16 carries coupling elements 17 which are alternatingly engageable with elements of the hub gearing to produce the several transmission ratios of which the hub is capable.

The outer end of the pull rod 74 is connected to the chain 22. Since the wire 14 and the chain 22 are tension members and unable to transmit compressive forces, positive actuation of movement of the pull rod 74 by the speed-change actuating lever 13 is limited to the outward stroke of the pull rod 74 and of the other transmission members operatively connected with the pull rod for joint movement. The return stroke of the pull rod 74 is actuated by the return spring 15 which permanently urges the sliding block 16 and the pull rod 74 to move axially inward in the hub 32 until the block 16 is stopped by abutment against an axially fixed hub element in the position illustrated in FIG. 1.

It will be understood that the half of the hub 32 not illustrated in FIG. 1 is virtually a mirror image of the portion shown.

The structure and operation of the speed-change actuator assembly 3 of FIG. 1 will be best understood from the exploded view of the several component elements thereof shown in FIG. 6 which illustrates in sequence from top to bottom: the back plate 36 with the elements directly mounted thereon, the actuating lever 13 with its extension plate 13a and associated members, the ratchet plate 6 and the component parts cooperating therewith, and finally the front plate 10 to which the body portion 11 of the speed-change actuator assembly is attached.

The back plate 36, the front plate 10, and the body portion 11 jointly provide a support on which the actuating elements of the assembly are movably mounted.

Referring first to the back plate 36, there is shown a circularly arcuate slot 37 from the center of which a pin 40 extends into the actuator housing substantially formed by the front plate 10, the body portion 11, and the back plate 36. A helical spring 38 is coaxially mounted on the pin 40 by means of a tubular spacer (not shown). The free ends 42 of the spring 38 extend radially toward the slot 37 and resiliently abut on either side against a bent-over lug 44 projecting inward from the edge of the back plate 36. The back plate also carries a second pin 60 parallel to the pin 40 and a cross member 66 for connection with other elements of the assembly as will become apparent as the description of FIG. 6 proceeds.

The actuating lever 13 and its integral extension plate 13a are pivotally mounted on the pin 40 by means of an opening 46 provided in the extension plate 13a. A stud 48 projects backward from the plate 13a for engagement with the arcuate slot 37 in the back plate 36 between the two free ends 42 of the spring 38. The spring, therefore, urges the stud into a normal position indicated by the broken outline of a circle between the free spring ends 42. The extension plate 13a has a cam face 64 spiraling away from the opening 46 in a clockwise direction. The cam face cooperates with a pawl 5 which is pivotally mounted on the pin 60 and has an end face 19. A dog 13b extends forward from an edge of the plate 13a opposite the cam face 64.

The ratchet plate 6 is superimposed on the extension plate 13a and is also pivotably mounted on the pin 40 which engages the opening 50 in the ratchet plate 6. The Bowden wire 14 of the control cable assembly 34 is inserted in a peripheral groove 52 of the ratchet plate and is held therein by the engagement of the enlarged head 54 of the wire 14 in a notch 56 of the ratchet plate, the head 54 being too large to slip through the groove 52. This arrangement permits quick disconnecting of the Bowden wire 14 from the speed-change actuator assembly. A movable indicator member 7 integral with the ratchet plate 6 extends therefrom in a radial direction. The dog 13b of the extension plate 13a cooperates with an abutment face 6a of the ratchet plate 6 which is shaped in such a manner that the extension plate 13a may move freely from its normal position in a counterclockwise direction relative to the ratchet plate 6, but that the dog 13b abuts against the face 6a when moving clockwise and takes the plate 6 along. The edge portion 58 opposite the abutment face 6a of the ratchet plate 6 is formed with three stepped ratchet faces 18, 20, and 21 for sequential engagement with the pawl 5 which is urged against the ratchet faces by one free end of a helical pawl spring 4 the other end of which abuts against a transverse element 62 of the body portion 11.

The front plate 10 carries the body portion 11 and is connected to the back plate 36 by the cross member 66, and the pins 60 and 40, the latter being rotatable in an opening 46' of the front plate 10. The front plate carries three fixed indicating marks 8 designated by numeral 9 as being correlated with the first, second, and third speed of the multiple-speed hub 32. The body portion 11 has the Bowden tube 1 attached thereto by means of the nipple 2 and the lock nut 2a. The cross member 66 is fastened to the bracket 24.

The assembled speed-change actuator assembly 3 is shown in FIG. 2 with the variable speed transmission set for its third or highest speed in which the spring 15 has pushed the sliding block 16 against the stop formed by an axially stationary member of the hub 32. Because of stretching of the Bowden wire 14 and/or the chain 22, and/or because of shortening of the Bowden tube 1 under the compressive stresses exerted thereon whenever the gears in the hub 32 are shifted, the indicator member 7 of the ratchet plate 6 is out of radial alignment with the fixed mark 8 designated by the numeral III by an angle 12.

As best seen from FIG. 1, the end face 19 of the pawl 5 is spaced from the ratchet face 18 and the lever 13 has an angular play the magnitude of which is equal to the angle 12.

FIG. 3 illustrates the speed-actuator assembly of FIGS. 1 and 2 after shortening of the effective length of the Bowden wire 14 by axially moving the nipple 2 outward of the speed-change actuator housing on its threads. The end face 19 of the pawl 5 is seen to abut against the ratchet face 18. FIG. 4 which shows the apparatus of FIG. 3 in side elevation indicates alignment between the movable indicator member and the fixed mark 8 corresponding to the third speed of the transmission.

FIG. 5 shows the transmission arrangement of FIGS. 1–4 in adjusted condition and set for the second (normal or intermediate) speed of the transmission. The movable indicator member 7 is aligned with the numeral II on the front plate 10 and with its fixed mark 8. It will be appreciated that in the position shown the end face 19 of the pawl 5 is in abutting engagement with the ratchet face 20. The sliding block 16 is axially displaced outwardly of the hub from the position illustrated in FIG. 1 and the coupling elements 17 are in engagement with different gearing elements to produce the lower speed II in a well-known manner.

Shifting of gears and speed changes are actuated by the lever 13 in the following manner:

When the lever 13 is pivoted clockwise on the pin 40, the dog 13b abuts against the face 6a and the ratchet plate 6 is rotated in a clockwise direction. The pawl 5 successively passes over the ratchet faces 18, 20, and 21. When the lever 13 is pivoted counterclockwise, engagement of the cam face 64 with the pawl 5 successively lifts the pawl 5 from engagement with the stepped faces 21, 20, and 18 so that the ratchet plate is permitted to yield to the tension of the spring 15 transmitted by the wire 14 and to move in steps after each of which the end face 19 of the pawl 5 engages the next ratchet face. It is lifted therefrom by continued movement of the cam face 64 of the extension plate 13a.

Adjustment of the effective length of the Bowden wire 14 is achieved by increasing or decreasing the effective length of the Bowden tube 1 by means of the nipple 2. The ratchet plate 6 is first set for third speed by counterclockwise movement of the lever 13 as viewed in the drawing. The nipple 2 is then rotated until the tension wire 14 is slack so that the axially movable transmission members assume the position shown in FIG. 1. The ratchet plate 6 is then pivoted clockwise by moving the actuating lever 13 to second speed (normal speed) or to first (slow) speed and back again counterclockwise to third speed position. The ratchet plate 6 which is biased toward clockwise movement by the pawl spring 4 the force of which is transmitted by the pawl 5, and the counterclockwise movement of which is also impeded by friction will move back toward the third position only as long as the tension of the spring 15 acts on the ratchet plate 6 by means of the wire 14, that is, as long as the wire is taut as shown in FIGS. 1 and 2. The movable indicator member 7 is offset relative to the fixed mark 8 corresponding to third speed by the angle 12. The Bowden wire 14 remains tensioned by the force of the spring 4 and the bearing friction of the plate 6 on the pin 40 when the spring 15 reaches its most relaxed position in the hub. The nipple 2 is now moved, on its threads 72 outward of the housing of the speed change actuator assembly so as to increase the effective length of the Bowden tube 1 until the ratchet plate 6 assumes the proper position thereof corresponding to the third speed of the transmission, that is, a position of alignment of the proper fixed mark 8 with the movable indicator member 7 in which the stepped ratchet face 18 abuts against the end face 19 of the pawl 5.

The adjusted position of the actuator assembly is then secured by tightening the nut 2a. Since the marks 8 corresponding to the first and second speeds of the transmission were placed to align with the movable indicator member 7 when the transmission was first assembled, adjustment of the third speed automatically adjusts the transmission arrangement for the other speeds as well.

The tension produced in the Bowden wire 14 by the combined force of the spring 4 and the frictional forces must always be smaller than the force of the return spring 15 so that the return spring is able to overcome the resistance of the tensioning forces and to move the sliding block 16 into abutment against an axially immovable element in the gear hub which thus acts as a stop.

The adjustment operation described above does not require any tools and can actually be performed with one hand by a reasonably secure bicycle rider even while operating the vehicle. If the corresponding positions of the actuator assembly and the transmission members are out of adjustment, this condition is promptly detected by the lack of alignment of the movable indicating member with the fixed marks on the front plate. When the speed change actuator assembly is mounted on the handlebars, as will usually be the case, the indicator marks are always before the eyes of the operator and the progress of adjustment can be followed visually without requiring the eye to be taken off the adjusting means, namely the nipple 2. Being mounted on the handle bar, the adjusting means are as far removed from the roadbed and the contamination originating there as is feasible on a bicycle.

It should be understood of course that the foregoing disclosure relates only to preferred embodiments of the invention, and that it is intended to cover all changes and modifications of the example of the invention herein chosen for the purpose of the disclosure which do not constitute departures from the spirit and scope of the invention set forth in the appended claims.

What I claim is:

1. In a multi-speed transmission arrangement for a bicycle and the like, in combination,
   (a) a support;
   (b) speed change actuating means mounted on said support for movement between a plurality of spaced, normal positions relative to said support corresponding to different speed ratios of said transmission arrangement;
   (c) a transmission member movable between a plurality of fixed positions corresponding to said speed ratios;
   (d) a tension member operatively connected to said actuating means and said transmission member for moving the latter in one direction in response to movement of said actuating means in a corresponding direction;
   (e) means for resiliently biasing said transmission member in a direction opposite said one direction;
   (f) means for limiting movement of said transmission member in said opposite direction in one of said fixed positions corresponding to one of said speed ratios;
   (g) a plurality of cooperating indicia means on said support and on said actuating means respectively, said indicia means being in alignment when said actuating means is in the one normal position thereof corresponding to said one speed ratio;
   (h) means for tensioning said tension member in said one direction, said tensioning means being weaker than said resilient means; and
   (i) adjusting means mounted on said support for adjusting the effective length of said tension member, whereby the position of said actuating means may be adjusted to said one position thereof while said transmission member is in said one fixed position thereof.

2. In a transmission arrangement as set forth in claim 1,
   (j) a hub having an axis, said transmission member being axially movable in said hub;
   (k) a bicycle portion fixedly spaced from said hub;
   (l) said tension member including a Bowden tube interposed between said bicycle portion and said support and a Bowden cable in said tube, said Bowden cable and said Bowden tube jointly constituting a Bowden cable assembly.

3. In a transmission arrangement as set forth in claim 2, said adjusting means being means for adjusting the length of said Bowden tube between said bicycle portion and said support.

4. In a transmission arrangement as set forth in claim 3, said adjusting means including a rotatable sleeve on said tube engaging said support.

5. In a transmission arrangement as set forth in claim 1, said actuating means including a pair of cooperating members, one member of said pair being manually operable, said cooperating members being connected for movement in unison in said corresponding direction, and said tension member being connected to the other member of said pair.

6. In a transmission arrangement as set forth in claim 5, the members of said pair being movable independently in a direction opposite said corresponding direction, and a portion of said indicia means being on said other member of said pair.

7. In a transmission arrangement as set forth in claim 1, said support constituting a housing enclosing a portion of said speed change actuating means, a portion of said indicia means being on said housing.

8. In a transmission arrangement as set forth in claim 6, the remainder of said indicia means being on said actuating means and projecting from said housing for alignment with the indicia means portion on the latter.

9. In a multi-speed transmission arrangement for a bicycle and the like, in combination,
   (a) a support;
   (b) speed change actuating means mounted on said support for movement between a plurality of spaced, normal positions relative to said support corresponding to different speed ratios of said transmission arrangement;
   (c) a transmission member movable between a plurality of fixed positions corresponding to said speed ratios;
   (d) a tension member operatively connected to said actuating means and said transmission member for moving the latter in one direction in response to movement of said actuating means in a corresponding direction;
   (e) means for resiliently biasing said transmission member in a direction opposite said one direction;
   (f) means for limiting movement of said transmission member in said opposite direction in one of said fixed positions corresponding to one of said speed ratios;
   (g) a plurality of cooperating indicia means on said support and on said actuating means respectively, said indicia means being in alignment when said actuating means is in the one normal position thereof corresponding to said one speed ratio;
   (h) means for tensioning said tension member in said one direction, said tensioning means being weaker than said resilient means; and
   (i) adjusting means mounted on said support for adjusting the position of said actuating means into said one normal position thereof while said transmission member is in said one fixed position.

(References on following page)

References Cited in the file of this patent

UNITED STATES PATENTS

| | | |
|---|---|---|
| 1,590,724 | Caretta | June 29, 1926 |
| 2,336,682 | Gross | Dec. 14, 1943 |
| 2,785,586 | Schwerdhofer | Mar. 19, 1957 |
| 2,799,183 | Rhein et al. | July 16, 1957 |
| 2,857,676 | Schwerdhofer | Oct. 28, 1958 |

FOREIGN PATENTS

| | | |
|---|---|---|
| 811,574 | France | Jan. 18, 1937 |
| 1,141,954 | France | Mar. 25, 1957 |
| 63,919 | France | May 4, 1955 |
| | (First addition to 1,074,141) | |

OTHER REFERENCES

Germany, F15,926II63k, May 17, 1956.